US006699316B2

(12) United States Patent
Marx et al.

(10) Patent No.: US 6,699,316 B2
(45) Date of Patent: Mar. 2, 2004

(54) PROCESS FOR THE PREPARATION OF NANO-ZINC OXIDE DISPERSIONS STABILIZED BY HYDROXYL GROUP-CONTAINING INORGANIC POLYMERS

(75) Inventors: Thiemo Marx, Viersen (DE); Michael Mager, Leverkusen (DE); Volker Wege, Neuss-Rosellen (DE); Steffen Hofacker, Odenthal (DE)

(73) Assignee: Bayer Atiengesellschaft, Leverkusen (DE)

( * ) Notice: Subject to any disclaimer, the term of this patent is extended or adjusted under 35 U.S.C. 154(b) by 0 days.

(21) Appl. No.: 10/385,554

(22) Filed: Mar. 11, 2003

(65) Prior Publication Data

US 2003/0172845 A1 Sep. 18, 2003

(30) Foreign Application Priority Data

Mar. 15, 2002 (DE) ............................................. 10212121

(51) Int. Cl.[7] ................................................. C09C 1/04
(52) U.S. Cl. ........................... 106/425; 106/429; 516/33
(58) Field of Search ................................. 106/425, 429; 516/33

(56) References Cited

U.S. PATENT DOCUMENTS 5,914,101 A * 6/1999 Tapley et al. .................. 424/59
2001/0044020 A1 11/2001 Hofacker et al. ........... 428/328

FOREIGN PATENT DOCUMENTS

| DE | 199 07 704 | 8/2000 |
| EP | 0 824 086 | 2/1998 |
| WO | 99/21934 | 5/1999 |

* cited by examiner

Primary Examiner—C. Melissa Koslow
Assistant Examiner—Shalie Manlove
(74) Attorney, Agent, or Firm—Joseph C. Gil

(57) ABSTRACT

The invention relates to a process for the preparation of nano-zinc oxide dispersions stabilized by hydroxyl group-containing inorganic polymers.

4 Claims, No Drawings

PROCESS FOR THE PREPARATION OF NANO-ZINC OXIDE DISPERSIONS STABILIZED BY HYDROXYL GROUP-CONTAINING INORGANIC POLYMERS

BACKGROUND OF THE INVENTION

The invention relates to a process for the preparation of nano-zinc oxide dispersions stabilized by hydroxyl group-containing inorganic polymers. The established preparation routes for zinc oxide nanoparticles proceed either via calcination processes of suitable precursors or via wet-chemical precipitation methods. An overview of the preparation of zinc oxide nanoparticles and the dispersibility in water and water- and/or halogen-containing organic solvents, optionally with the addition of stabilizers such as betaines, polyols or aminoalcohols, is given, for example, in DE-A 199 07 704.

EP-A 1 146 069 A2 describes inorganic coating systems based on nano-ZnO particles for the UV-protective coating of various substrates. The preparation of the nano-ZnO particles or corresponding sols used is carried out in accordance with DE-A 199 07 704. EP-A 1 146 069 likewise describes that the nano-ZnO particles can be surface-modified with alkoxysilanes. The dispersions which can be prepared in this way have a high degree of dispersion of the ZnO particles, but exhibit very limited storage stability (<48 hours) and have high contents of halogenated hydrocarbons (>5% by weight).

According to the prior art, it is known that anhydrous nano-zinc oxide dispersions in which the particles are present in the form of a primary particle dispersion can only be prepared in organic solvents if the dispersion medium additionally contains halogen-containing compounds such as chlorinated hydrocarbons. However, halogenated components are toxicologically unacceptable and are therefore unsuitable for the production of coatings. It is also known that nano-zinc oxide dispersions are not obtainable by simply exchanging the solvent, e.g. by adding a higher-boiling, nonhalogenated solvent and distilling off the halogen-containing constituents. This always results in irreversible agglomeration of the nano-zinc oxide particles, and subsequent production of transparent coatings becomes impossible.

An object of the present invention was therefore to provide a process for the preparation of nano-zinc oxide dispersions with improved storage stability. Within a shelf life (pot life) of these dispersions which is sufficiently long for a large number of applications, no clouding and/or flocculation of the nano-zinc oxide dispersions arises as a result of particle aggregation or agglomeration. Neither does gelling or solidification of the system of nanoparticles and dispersion medium (consisting of one or more solvents and optionally a stabilizer) arise. Furthermore, they have a markedly reduced content of halogenated, constituents.

DESCRIPTION OF THE INVENTION

The present invention therefore provides a process for the preparation of nano-zinc oxide dispersions, where the storage stability of the resulting dispersions between −50 and +250° C., preferably between 0 and 80° C., in particular between 10 and 40° C., is greater than 48 hours, and the dispersions have a content of halogenated constituents of less than 5% by weight, comprising:

A) dispersing zinc oxide nanoparticles in a halogen-containing medium,

B) adding the dispersion obtained in step A), optionally with stirring, to a solution of hydroxyl group-containing inorganic polymers, and C) removing the halogen-containing constituents by distillation at atmospheric pressure or by condensation under reduced pressure.

Reduced pressure is understood as meaning pressures between 0 and 1000 mbar, preferably 10 and 300 mbar.

In the process according to the invention, it is possible to prepare nanozinc oxide dispersions whose storage stability between −50 and +250° C., preferably between 0 and 80° C., in particular between 10 and 40° C., is greater than 48 hours (two days). Over the course of this period, no gellations and/or aggregations or agglomerations of the nano-zinc oxide can be identified (e.g. by transmission electron micrographs, TEM).

According to the invention, storage stability is understood as meaning the pot life, shelf life or gel time. Over the course of this period the dispersion is stable.

The storage stability of the dispersions prepared according to the invention is at least 48 hours (two days). They are sedimentation-stable and storable over days, preferably weeks, in particular over months, without any separation, precipitation, gelling or hardening resulting.

The zinc oxide nanoparticles used in the process according to the invention have a primary particle size of from 1 to 500 nm, preferably from 1 to 100 nm, and particularly preferably from 1 to 30 nm. The agglomerate size is less than 10 $\mu$m, preferably less than 1 $\mu$m, and particularly preferably less than 0.1 $\mu$m. The zinc oxide nanoparticles used may be crystalline, partially crystalline or amorphous. Preference is given to using X-ray-crystalline zinc oxide nanoparticles.

The particle sizes of the ZnO particles stated refer to results from ultracentrifugation measurements (H. G. Müller, Colloid. Polym. Sci., 267, 1113–1116 (1989)).

The dispersible zinc oxide nanoparticles used in the process according to the invention are prepared, for example, in accordance with the process described in DE-A 199 07 704 A1. It is, however, also possible to use ZnO nanoparticles which have been prepared by other processes.

The hydroxyl group-containing inorganic polymers B) used in the process according to the invention contain at least one element from the 3rd and 4th main group of the Mendeleev Periodic Table of the Elements which contains at least one hydroxyl group and, in addition to the hydroxyl groups, optionally one or more further nonhydrolysable groups. Preference is given to polymers containing the element silicon, germanium, boron, aluminium and/or indium, particularly preferably silicon, boron and/or aluminium.

Inorganic polymers containing the element silicon preferably additionally contain nonhydrolysable groups, such as optionally substituted alkyland/or aryl radicals, particularly preferably $C_1$–$C_4$-alkyl and/or $C_6$-phenyl radicals, very particularly preferably $C_1$–$C_3$-alkyl radicals.

The inorganic polymers described can be obtained, for example, by hydrolysis and condensation of monomeric and/or oligomeric alkoxysilanes or organoalkoxysilanes (sol-gel process). The hydrolysis and condensation of appropriate alkoxysilanes is part of the prior art and is described in detail, for example, in "Sol-Gel Science", J. Brinker, 1990.

To prepare the inorganic polymers used in the process according to the invention, alkoxysilanes of the formula (I), for example, can be used, $$(Y)_a(Y')_b Si(OR)_c \qquad (I)$$

where

Y, Y' are each hydrogen, an optionally substituted $C_1$–$C_{20}$-alkyl or $C_6$-aryl radical, R is a $C_1$–$C_8$-alkyl radical or a phenyl radical, a, b and c, independently of one another, may be 0, 1, 2, 3 or 4 and the sum (a+b+c)=4.

Preference is given to using alkoxysilanes of the formula (II)

(Y)$_a$(Y')$_b$Si(OR)$_c$      (II)

where

Y, Y' are each an H, a $C_1$–$C_8$-alkyl or $C_6$-aryl radical,

R is a $C_1$–$C_4$-alkyl radical or a phenyl radical, a, b and c, independently of one another, may be 0, 1, 2 or 3 and the sum (a+b+c)=4.

Specifically, mention may be made of the following alkoxysilanes and organoalkoxysilanes:

a.) $Si(OCH_3)_4$, $Si(OC_2H_5)_4$;

b.) $CH_3Si(OCH_3)_3$, $C_2H_5—Si(OCH_3)_3$, phenyl-$Si(OCH_3)_3$, $CH_3—Si(OC_2H_5)_3$, $C_2H_5—Si(OC_2H_5)_3$, phenyl-Si$(OC_2H_5)_3$, 3-glycidoxypropyl-$Si(OCH_3)_3$, 3-acetoxypropyl-$Si(OCH_3)_3$, 3-methacryloxypropyl-Si$(OCH_3)_3$, 3-mercaptopropyl-$Si(OCH_3)_3$, 3-cyanopropyl-$Si(OCH_3)_3$, isocyanatopropyl-Si$(OCH_3)_3$, 3-aminopropyl-$Si(OCH_3)_3$;

c.) $(CH_3)_2Si(OCH_3)_2$, $(CH_3)_2Si(OC_2H_5)_2$, $(C_2H_5)_2Si(OCH_3)_2$, $(C_2H_5)_2Si(OC_2H_5)_2$, (n-butyl)$_2Si(OC_2H_5)_2$, (n-butyl)$_2Si(OCH_3)_2$, (i-propyl)$_2Si(OC_2H_5)_2$, (i-propyl)$_2Si(OCH_3)_2$, $(CH_3)$(phenyl)$Si(OC_2H_5)_2$, $(CH_3)$(phenyl)$Si(OCH_3)_2$, $(CH_3)$(H)$Si(OCH_3)_2$, $(CH_3)$(H)$Si(OC_2H_5)_2$, $(CH_3)$(vinyl)$Si(OCH_3)_2$, $(CH_3)$(vinyl)$Si(OC_2H_5)_2$, $(CH_3)_2Si(O$-phenyl)$_2$, $(C_2H_5)_2Si(O$-phenyl)$_2$;

d.) $(CH_3)_3Si—OCH_3$, $(CH_3)_3Si—OC_2H_5$, $(C_2H_5)_3Si—OCH_3$, $(C_2H_5)_3Si—OC_2H_5$, $(CH_3)_3Si$-Ophenyl, $(C_2H_5)_3Si$-Ophenyl, (phenyl)$(CH_3)_2SiOCH_3$, (phenyl)$(CH_3)_2SiOC_2H_5$, (phenyl)$_2(CH_3)SiOCH_3$, (phenyl)$_2(CH_3)SiOC_2H_5$, (phenyl)$_3SiOCH_3$, (phenyl)$_3SiOC_2H_5$, (i-propyl)$(CH_3)_2SiOCH_3$, (i-propyl)$(CH_3)_2SiOC_2H_5$, (i-propyl)$_2(CH_3)SiOCH_3$, (i-propyl)$_2(CH_3)SiOC_2H_5$, (i-propyl)$_3SiOCH_3$, (i-propyl)$_3SiOC_2H_5$, (n-butyl)$(CH_3)_2SiOCH_3$, (n-butyl)$(CH_3)_2SiOC_2H_5$, (n-butyl)$_2(CH_3)SiOCH_3$, (n-butyl)$_2(CH_3)SiOC_2H_5$, (n-butyl)$_3SiOCH_3$, (n-butyl)$_3SiOC_2H_5$.

Further examples of inorganic monomers are polyfunctional alkoxysilanes and silanols of the formula (III)

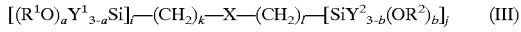

$[(R^1O)_aY^1{}_{3-a}Si]_i$—$(CH_2)_k$—X—$(CH_2)_l$—$[SiY^2{}_{3-b}(OR^2)_b]_j$      (III)

where $R^1$, $R^2$, independently of one another, are each a $C_1$–$C_8$-alkyl and/or $C_6$-aryl radical, $Y^1$, $Y^2$, independently of one another, are each an optionally substituted. $C_1$–$C_{20}$-alkyl or $C_6$-aryl radical, a, b, independently of one another, are each 1, 2 or 3, i+j is greater than or equal to 2, k, l, independently of one another, are each an integer from 0 to 10, and X is a bridging structural unit to which i+j alkoxysilyl groups $[(R^1O)_aY^1{}_{3-a}Si]$ or $[SiY^2{}_{3-b}(OR^2)_b]$ are bonded via a chemical bond.

In the process according to the invention, it is of course also possible to use mixtures of inorganic polymers which can be obtained, for example, by hydrolysis- and (co-) condensation of various (organo)alkoxysilanes. Preference is given here to mixtures of organosilanes of the formula (IV), $YSi(OR)_3$ with tetraalkoxysilanes of the formula (V), $Si(OR)_4$, and mixtures of organosilanes of the formula (VI), $Y_2Si(OR)_2$ with tetraalkoxysilanes of the formula (V), where Y and R have the meanings given in formula (II).

Hydroxyl group-containing inorganic polymers containing the elements silicon and aluminium can be obtained in an appropriate manner, by, for example, hydrolyzing and (co)condensing aluminium alkoxides with alkoxy and/or organoalkoxysilanes. The preparation of such heterocondensates is likewise part of the prior art and is likewise described, for example, in "Sol-Gel Science", J. Brinker, 1990.

The catalysts which may be used for the hydrolysis and condensation of inorganic monomers, oligomers and polymers are acids, bases, metal complexes and organometallic compounds. Acids which may be mentioned are, for example, p-toluenesulphonic acid, hydrochloric acid, formic acid and acetic acid. Bases which may be used are, for example, alkali metal (Li, Na, K) and alkaline earth metal (Mg, Ca, Ba) hydroxides. Preference is given to using acids, particularly preferably in the form of 0.1 N to 1.5 N aqueous solutions.

In one embodiment of the process according to the invention, the inorganic monomers, oligomers or polymers required to stabilize the zinc oxide nanoparticles are firstly dissolved in an organic solvent or solvent mixture. By adding water and optionally a catalyst, these are then partially or completely hydrolyzed, as a result of which compatibility with the dispersion prepared as in A) is improved. In this way, the hydroxyl group-containing inorganic polymers are obtained. Following the addition of the zinc oxide dispersion prepared as in A), preferably with stirring (step B)), the halogen-containing constituents are finally removed by distillation at atmospheric pressure or by condensation under reduced pressure (step C)).

In a preferred embodiment of the process according to the invention, the inorganic monomers and/or oligomers used are only hydrolyzed to a degree where the hydroxyl group-containing inorganic polymer is obtained which has the longest possible storage stability. In order that the hydrolysis and condensation does not continue too far, eventually resulting in gellation, preference is given to adding only from 0.1 to 0.99 mol of water, particularly preferably from 0.3 to 0.5 mol of water, per mole of hydrolysable group (e.g. Si—OR, Al—OR, B—OR). Following dispersion of the zinc oxide nanoparticles in a halogen-containing medium (step A)), the dispersion is then added to the resulting storage-stable, hydroxyl group-containing inorganic polymer (step B)), then the halogen-containing constituents are removed by distillation (step C)).

In general, the concentration of the alkoxy and/or hydroxyl components in the solvent is between 1 and 99% by weight, preferably between 10 and 90% by weight, in particular between 30 and 70% by weight. The degree of condensation of the hydroxyl groups and/or hydrolyzed alkoxy groups is generally between 1 and 99 mol %, preferably between 10 and 90 mol %, in particular between 30 and 70 mol %.

In order to obtain the dispersions according to the invention, the particles are incorporated into the sol/gel medium described above in a manner which generally involves adding ZnO predispersed in a suitable medium, (e.g. in accordance with DE-A 199 07 704, nano-ZnO in the form of a primary particle dispersion in $CH_2Cl_2$/MeOH), to an above-described solution of a sol/gel material/inorganic polymer so that ZnO concentrations of from 1 to 90% by weight, preferably from 10 to 50% by weight, are obtained.

In order to reduce the halogen content of the dispersions according to the invention, the solvent can generally be removed by distillation. In this regard, preference is given to admixing the dispersion with an organic solvent which is miscible with the dispersion according to the invention, does not lead to flocculation of the ZnO and has a higher boiling point than the halogen-containing solvent. In general, $C_1$–$C_{10}$-alcohols can be used for this purpose, preferably linear $C_4$–$C_8$-alcohols, in particular n-butanol. The mass m of the added solvent m(additive) is governed by the mass m of the halogen-containing solvent m(hcs) present. The ratio of m(additive) to m(hcs) is generally from 0 to 100, preferably from 1 to 10, in particular from 2 to 5. The mass of the low-boiling components m(low-boiling components) to be removed by distillation is governed by m(additive); for m(additive)≦m(hcs), then m(low-boiling components)=m(hcs). For m(additive)>m(hcs), then m(low-boiling components)=m(additive).

To improve the degree of dispersion of the particles it is possible to use the homogenization processes which belong to the prior art and employ devices such as high-speed stirrers (e.g. IKA-Ultra-Turrax® T25 basic, IKA-Werke GmbH & Co KG, D-79219 Staufen), ultrasound dispersers (e.g. UP200S, UP400S, Dr. Hielscher GmbH, D-14513 Berlin) and/or jet dispersers (Chem. Ing. Tech. (69), 6/97, p. 793–798; EP 07667997).

The dispersions according to the invention can be diluted by adding solvents, preferably mono-, bi- or oligofunctional alcohols, esters or ketones.

The dispersions prepared according to the invention can, for example, be incorporated into polymeric materials and into coating systems, e.g. PUR, epoxy resin coatings, and also into inorganic or inorganic/organic coatings.

In a particular embodiment of the invention, one organic modification of the sol/gel matrices is stabilized by a suitable reaction of reactive groups of the inorganic polymer, such as, for example, hydroxyl, epoxy, amino, acetoxy, methacryl, thiol or isocyanate groups, with suitably functionalized organic molecules, such as mono-, oligo- or polymers via reactions which form part of the prior art. This gives hybrids, the structure of which can be adapted to a wide range of various matrices, and which thus permit homogeneous incorporation of the dispersions prepared according to the invention into polymeric materials and coating systems. By using suitable organic binders/binder components, such as bi-, tri-, oligo- or polyfunctional alcohols, amines, isocyanates, carboxylic acids to modify the dispersions according to the invention, inorganic/organic hybrid coating systems are also accessible. The preparation of purely inorganic coating formulations is described, for example, in EP-A 1 146 069.

The invention is further illustrated but is not intended to be limited by the following examples in which all parts and percentages are by weight unless otherwise specified.

EXAMPLES

Unless mentioned otherwise, all of the chemicals used were acquired commercially and used without further purification.

Example 1

Preparation of Nano-ZnO in Accordance with DE-A 199 07 704

240.35 g of zinc oxide (technical-grade 99.8% by weight) were introduced into 1320 g of methanol (technical-grade 99.9% by weight) and heated to 50° C. By adding 355.74 g of glacial acetic acid (technical-grade 99.9% by weight) and 51.15 g of demineralized water, the solid was dissolved and then heated to 60° C. To remove undissolved fractions of ZnO, a total of 34.5 g of KOH (technical-grade 90.22% by weight) were added in 3 portions. The reaction mixture was after-stirred for 40 minutes, admixed with a solution of 290.00 g of KOH (technical-grade 90.22% by weight) in 660.00 g of methanol and stirred for a further 35 min at 60° C. Finally, the mixture was cooled to room temperature using an ice bath and the stirrer was switched off. After a sedimentation period of 14 h, the solid had settled out, the virtually clear methanolic phase was taken off and 700 g of fresh methanol were poured in again. The reaction mixture was stirred for 10 min and then, after the stirrer had been switched off, left to sediment again for 14 h. The methanolic supernatant was taken off again and the methanolic solids suspension was divided between 2 centrifuge beakers. The solid was compacted for 30 min at 5500 rpm in a bench centrifuge from Heraeus (Variofuge RF) with a rotor with a radius of 20.4 cm, and the clear supernatant was decanted off. The solids content of the gel was 75.8% by weight (drying: 1 h at 130° C.). Elemental analysis of the drying residue revealed a zinc content of 76% by weight, corresponding to 94.6% by weight of ZnO.

Example 2

Preparation of the Nano-Zinc Oxide Sol in Accordance with DE-A 199 07 704

A zinc oxide gel prepared as in Example 1 was taken up in the weight ratio 1:1 with dichloromethane and stirred for 30 min. The translucent sol was purified by sedimentation for 12 h and decantation of the sol from sedimented coarse particles, and subsequent pressure filtration over a 0.2 µm cellulose filter. Elemental analysis revealed a zinc content of 31% by weight, corresponding to 38.6% by weight of ZnO.

Example 3

With stirring, 14.0 g of cyclo-{SiO(CH$_3$)[(CH$_2$CH$_2$Si (CH$_3$)(OC$_2$H$_5$)$_2$]}$_4$ were initially introduced and admixed with 26.5 g of tetraethoxysilane and 50.0 g of 1-methoxy-2-propanol. 3.4 g of aqueous p-toluenesulphonic acid solution (0.1 n) were then added. Following after-stirring for 30 minutes, 30.5 g of a nano-ZnO-dichloromethane sol prepared as in Example 2 were added. The mixture was stirred for a further 15 min, admixed with a solution of 7.89 g of aluminium tributoxide, 4.2 g of ethyl acetoacetate and 2.6 g of 1-methoxy-2-propanol and stirred for a further 30 min. The resulting dispersion was sedimentation-stable, translucent and had no tendency toward gelling for months. Prepared transmission electron ("TE") micrographs of the particles of this dispersion demonstrate the finely divided state of the particles, which have, determined by ultracentrifugation measurement experiments to 98%, a numerical average particle size of 5 to 30 nm.

Example 4

To reduce the CH$_2$Cl$_2$ content of a dispersion described in Example 3, 60 g of n-butanol were added and then, at 50° C. and 200 mbar, 60 g of low-boiling components were distilled off. The CH$_2$Cl$_2$ content was thereby reduced to 0.04% by weight. The storage stability of the dispersion was not impaired as a result of changing the solvent.

Example 5

2.5 g of 1-methoxy-2-propanol were admixed, with ice cooling, with 9.8 g of aluminium tri-sec-butoxide. 6.7 g of ethyl acetoacetate were then added and the mixture was after-stirred for a further half hour with ice cooling. The mixture was then heated to 60° C., and 21.0 g of a 35% strength solution of cyclo-$\{SiO(CH_3)[(CH_2CH_2Si(CH_3)_2OH]\}_4$, prepared as described in U.S. Pat. No. 5,880,305, in 1-methoxy-2-propanol were added over the course of 5 h. When the addition was complete, the mixture was cooled to room temperature with stirring. Then, 23.2 g of tetraethyl orthosilicate, 20.1 g of n-butanol and 2.0 g of aqueous 0.1 normal p-toluenesulphonic acid were added one after the other. After a post-stirring time of 60 min, 37.9 g of a nano-ZnO-dichloromethane sol prepared as in Example 2 were added. The resulting dispersion was sedimentation-stable, translucent and had no tendency toward gelling for months. Prepared transmission electron ("TE") micrographs of the particles of this dispersion demonstrate the finely divided state of the particles, which have, determined by ultracentrifugation measurement experiments to 98%, a numerical average particle size of 5 to 30 nm.

Example 6

9.2 g of tetraethoxysilane were dissolved in 9.2 g of 1-methoxy-2-propanol and then admixed with 1.6 g of aqueous p-toluenesulphonic acid solution (0.1 n). The mixture was stirred for a further 3 hours and then admixed with 10.0 g of a nano-ZnO-dichloromethane sol prepared as in Example 2. The mixture was after-stirred for 5 min and, finally, admixed with 5 g of 3-glycidoxypropyltrimethoxysilane. The resulting dispersion was sedimentation-stable, translucent and had no tendency towards gelling for months. Prepared transmission electron ("TE") micrographs of the particles of this dispersion demonstrate the finely divided state of the particles, which have, determined by ultracentrifugation measurement experiments to 98%, a numerical average particle size of 5 to 30 nm.

Example 7

9.2 g of tetraethoxysilane were dissolved in 9.2 g of 1-methoxy-2-propanol and then admixed with 1.6 g of aqueous p-toluenesulphonic acid solution (0.1 n). The mixture was stirred for a further 3 hours and then admixed with 10.0 g of a nano-ZnO-dichloromethane sol prepared as in Example 2. The mixture was stirred for a further 5 min and, finally, admixed with 5 g of 3-methacryloxypropyltrimethoxysilane. The resulting dispersion was sedimentation-stable, translucent and did not show any tendency toward gelling for months. Prepared transmission electron ("TE") micrographs of the particles of this dispersion demonstrate the finely divided state of the particles, which have, determined by ultracentrifugation measurement experiments to 98%, a numerical average particle size of 5 to 30 nm.

Example 8

9.2 g of tetraethoxysilane were dissolved in 9.2 g of 1-methoxy-2-propanol and then admixed with 1.6 g of aqueous p-toluenesulphonic acid solution (0.1 n). The mixture was stirred for a further 3 hours and then admixed with 10.0 g of a nano-ZnO-dichloromethane sol prepared as in Example 2. The mixture was stirred for a further 5 min and, finally, admixed with 5 g of 3-acetoxypropyltrimethoxysilane. The resulting dispersion was sedimentation-stable, translucent and did not show any tendency toward gelling for months. Prepared transmission electron ("TE") micrographs of the particles of this dispersion demonstrate the finely divided state of the particles, which have, determined by ultracentrifugation measurement experiments to 98%, a numerical average particle size of 5 to 30 nm.

Example 9

The dichloromethane content of the dispersion described in Examples 5 to 8 was reduced by the addition of 13.6 g of n-butanol and subsequent distillative removal of 13.6 g of low-boiling components at 50° C. and 200 mbar to less than 0.05% by weight (determined by gas chromatography).

The storage stability of the dispersions was not changed as a result of this.

Example 10

5.16 g of a polyacrylate polyol with an OH content in accordance with DIN 53 240/2 of 3.2±0.4% (Desmophen A665BA, 70% strength by weight in butyl acetate, Bayer AG) were dissolved in 5.23 g of 1-methoxy-2-propanol. After stirring for 5 minutes, 32.76 g of a nano-ZnO dispersion prepared as in Example 7 and processed as in Example 9 were added. The product was after-stirred for 10 minutes. This gave a translucent dispersion with long-term stability.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of nano-zinc oxide dispersions, where the storage stability of the resulting dispersions at temperatures between −50 and +250° C. is greater than 48 h, and the dispersions have a content of halogenated constituents of less than 5% by weight, comprising:

A) dispersing zinc oxide nanoparticles in a halogen-containing medium,

B) adding the dispersion obtained in step A), optionally with stirring, to a solution of hydroxyl group-containing inorganic polymers, and C) removing the halogen-containing constituents by distillation at atmospheric pressure or by condensation under reduced pressure.

2. The process of claim 1, wherein the hydroxyl group-containing inorganic polymers B) contain at least one element from the 3rd and 4th main group of the Mendeleev Periodic Table of the Elements which comprises at least one hydroxyl group attached.

3. The process of claim 1, wherein the zinc oxide particles are present in the form of a primary particle dispersion.

4. The process of claim 1, wherein the zinc oxide nanoparticles are in a size range from 1 to 500 nm.

* * * * *